Patented Dec. 18, 1934

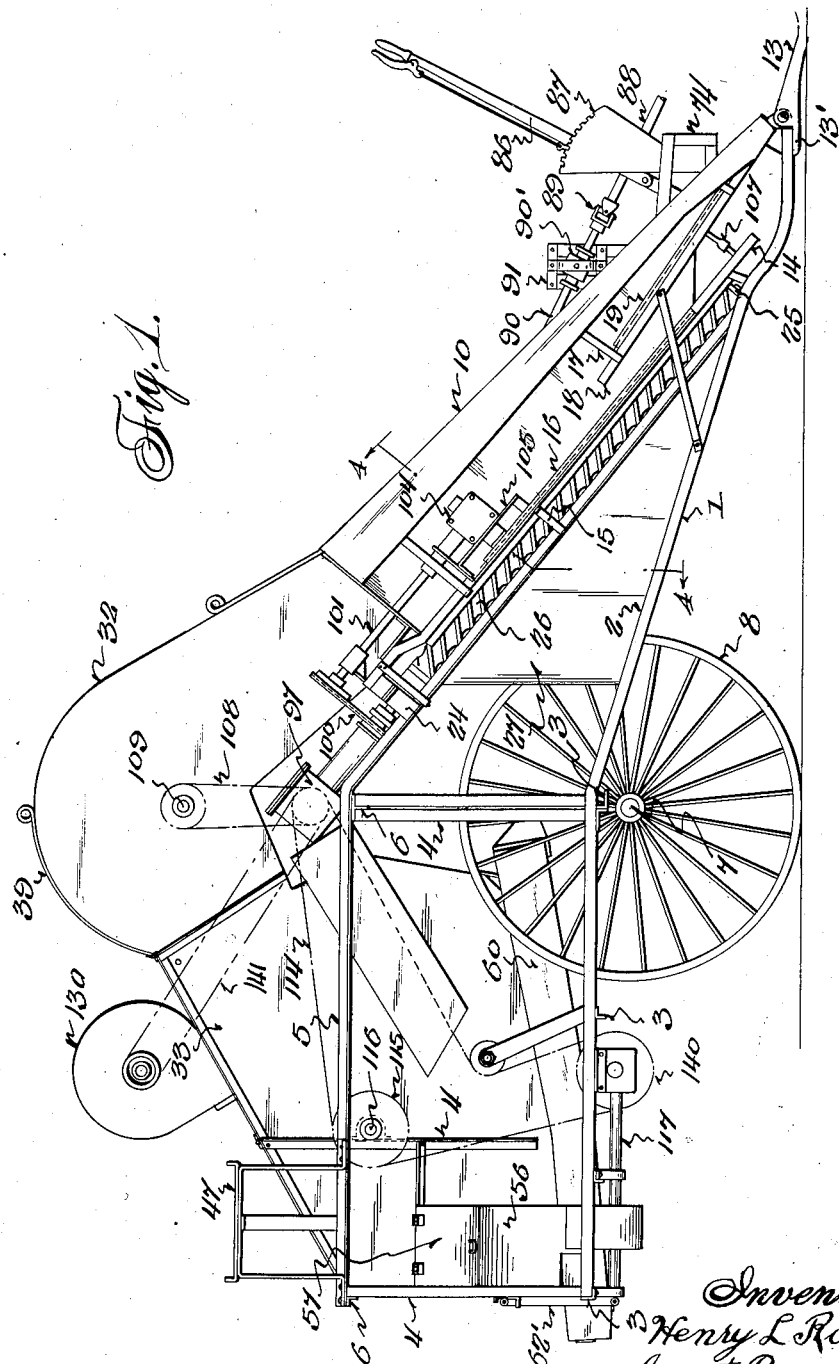

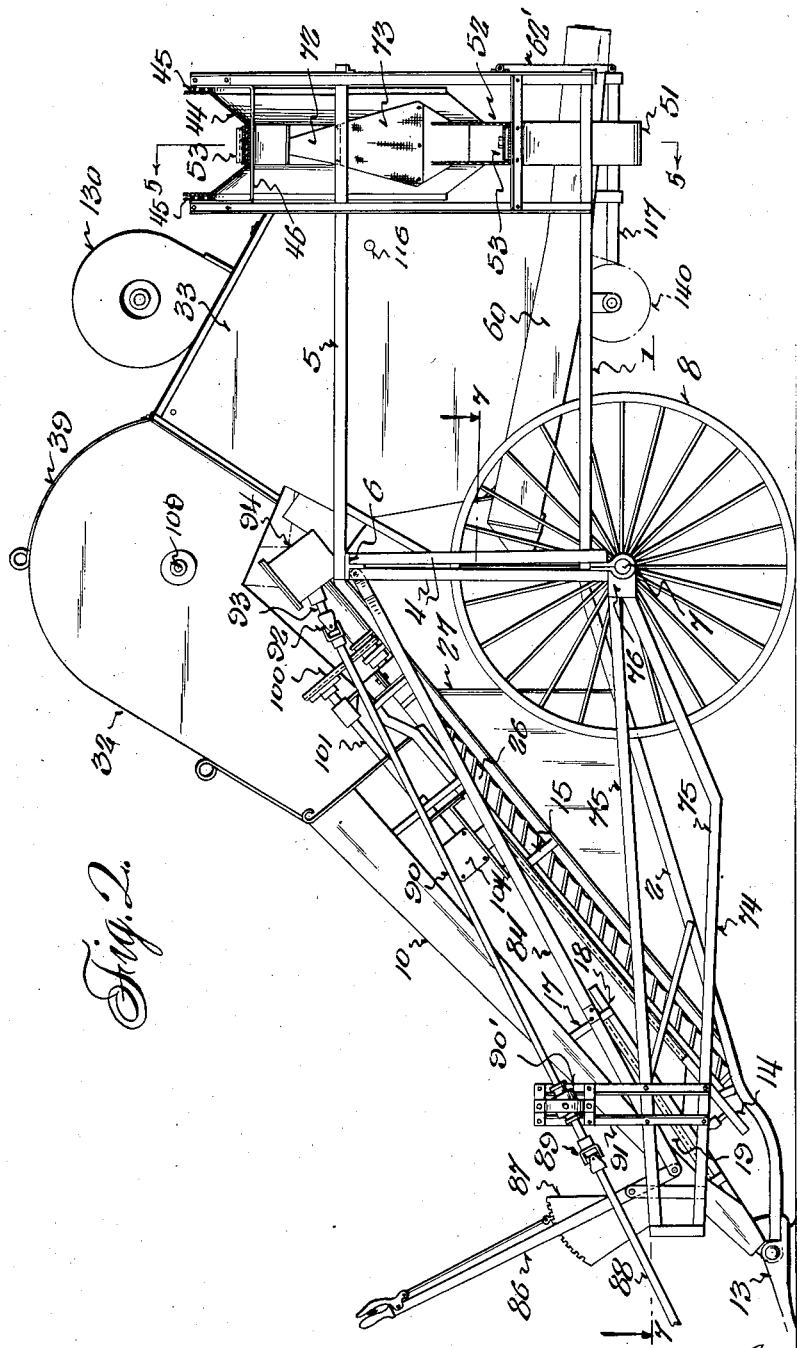

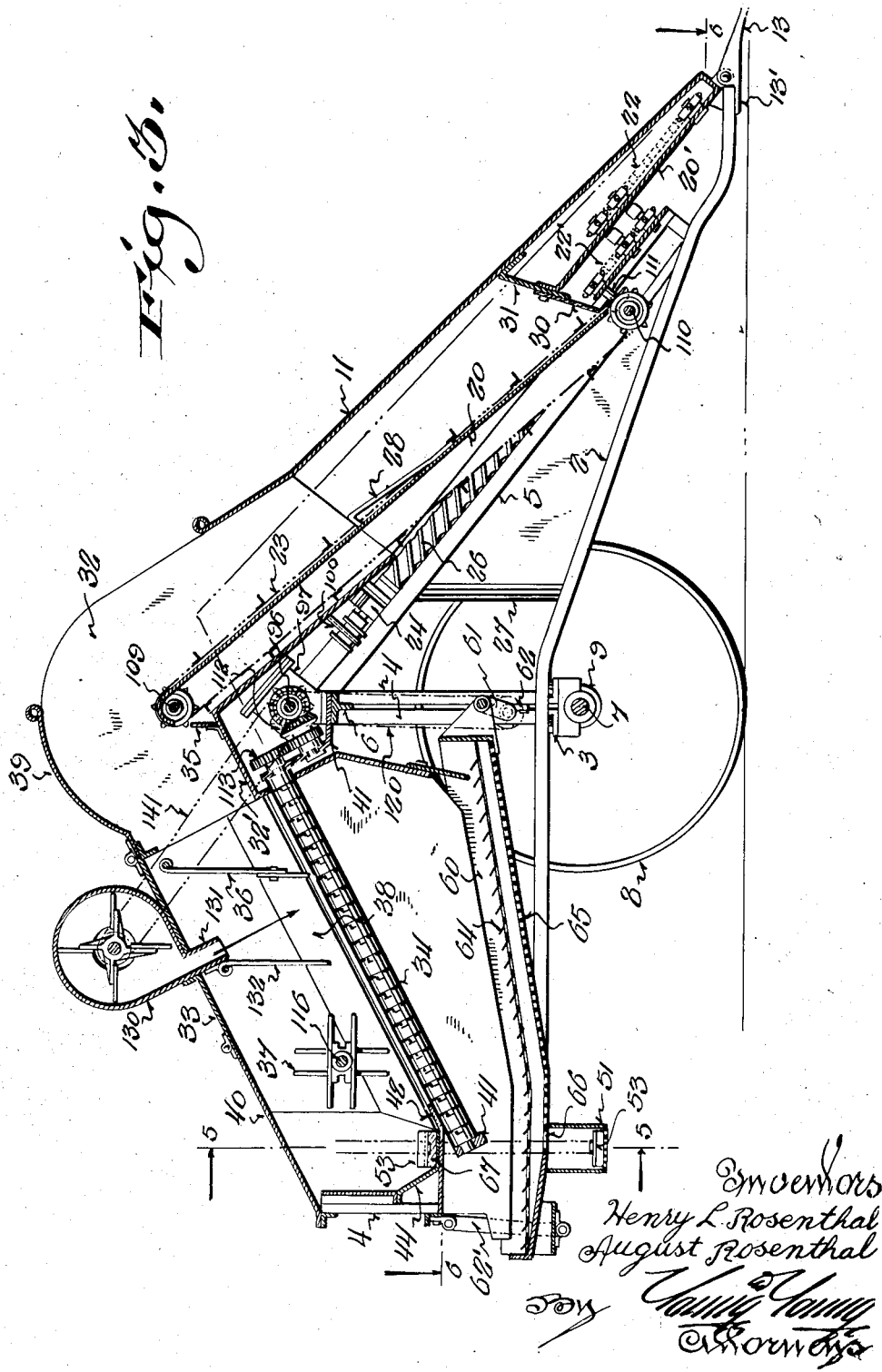

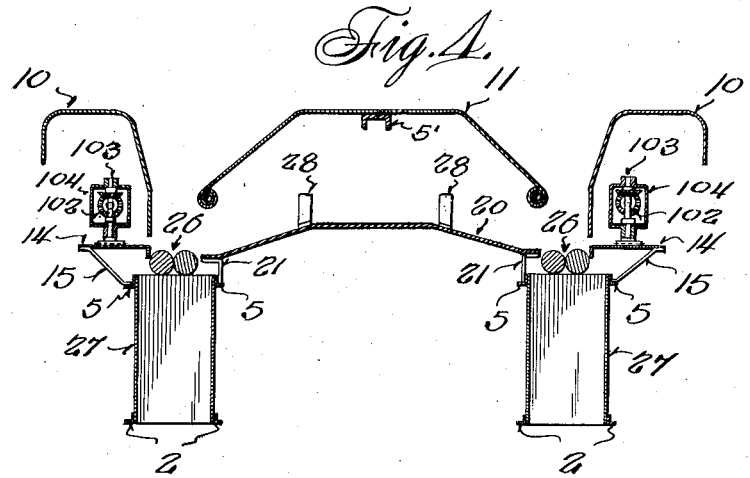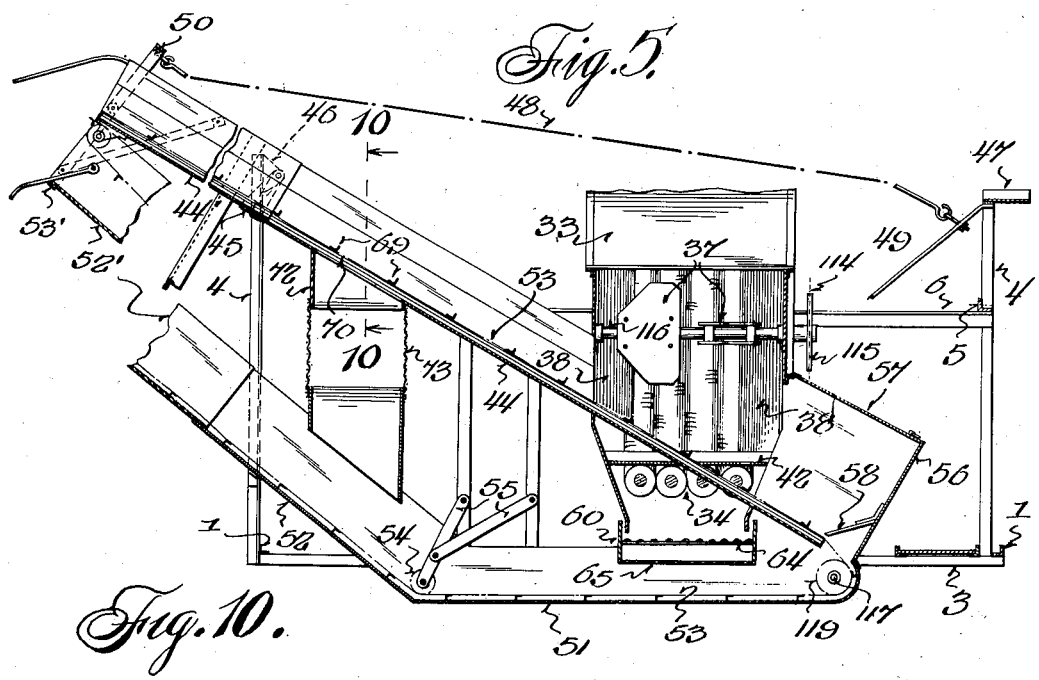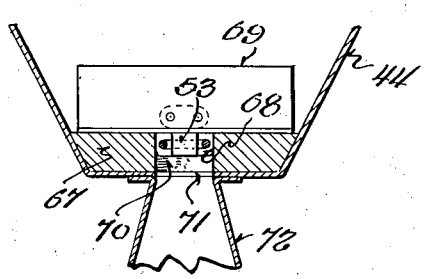

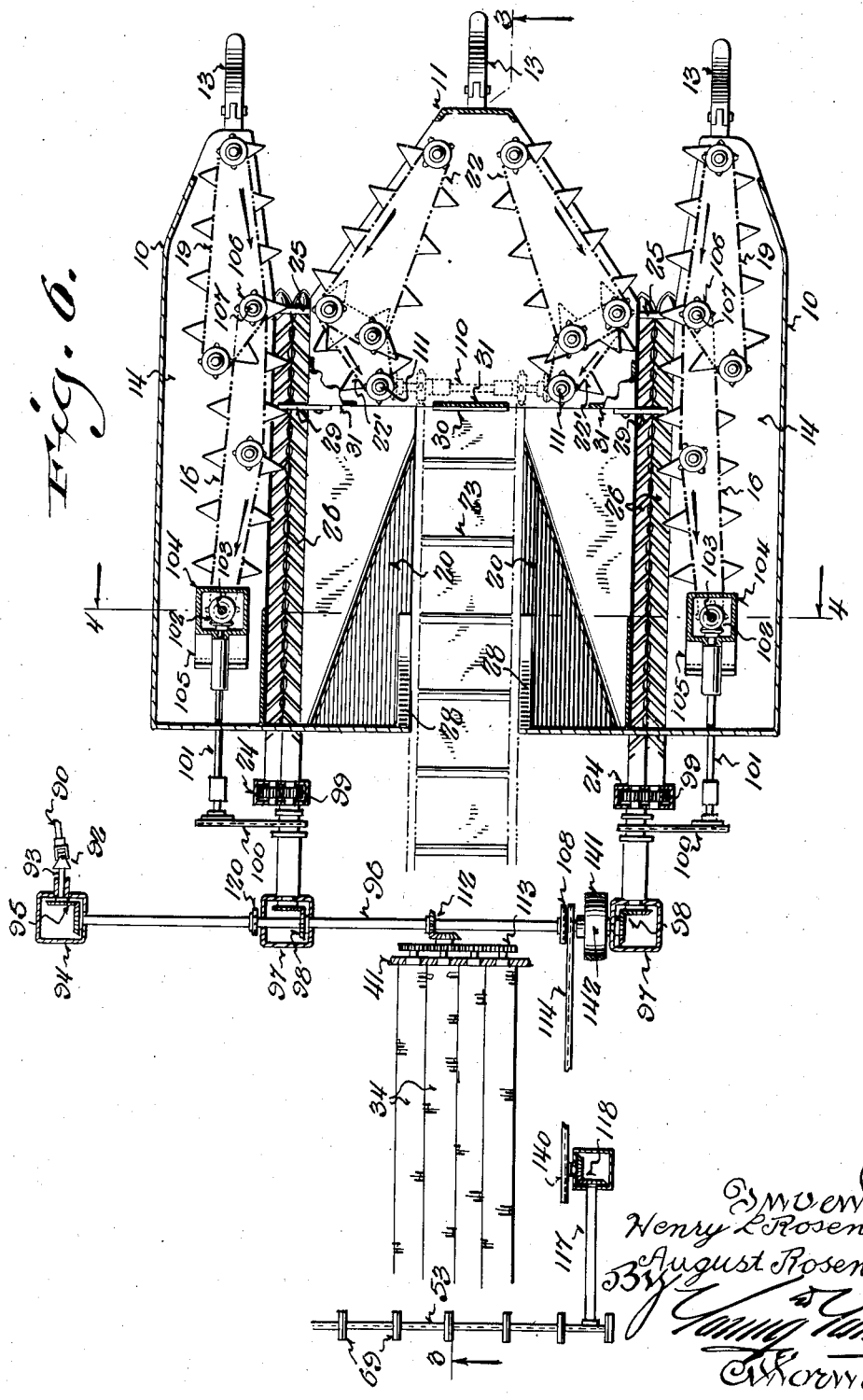

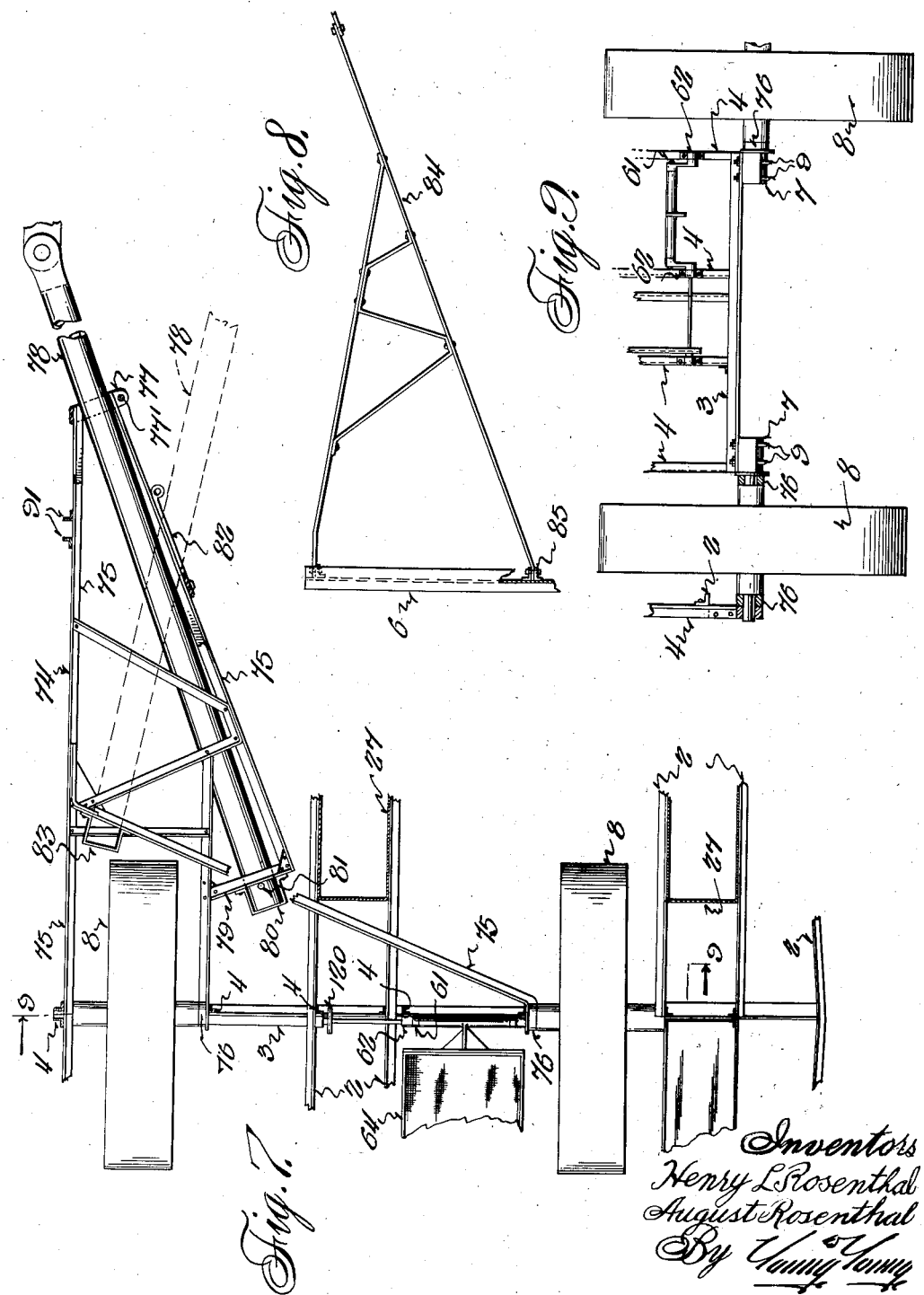

1,984,895

UNITED STATES PATENT OFFICE 1,984,895

CORN HARVESTER

August Rosenthal and Henry L. Rosenthal, Wauwatosa, Wis., assignors to Rosenthal Manufacturing Co., West Allis, Wis.

Application December 16, 1932, Serial No. 647,536

16 Claims. (Cl. 56—18)

The present invention pertains to corn harvesters, and more particularly to a combined picker and husker.

The invention has primarily for its object to improve present structures of the foregoing type by the provision of a machine of comparatively simple design, minimum weight, and exceedingly increased capacity and efficiency.

Incidental to the foregoing, a more specific object resides in the provision of a corn harvester in which means is provided for eliminating stalks and refuse from the ears prior to delivery of the same to the husking rolls, thus insuring delivery of the ears in an exceedingly clean condition.

To accomplish the foregoing, a further object is to incline the picking rolls and elevating conveyor at different angles to position the conveyor above the rolls throughout the greater portion of its length, whereby stalks and other refuse are deflected away from the conveyor.

To increase the capacity of the machine, a more detailed object resides in the alined arrangement of the elevating conveyor for the picked ears with the husking rolls, whereby change in the direction of travel of the ears is avoided, thus reducing the time required for travel of the ears through the operating rolls to a minimum.

A further object of the invention resides in the provision of means for creating a circulation of air through the husking rolls to further eliminate such refuse, or loose husks, as may reach the husking rolls, thus facilitating the husking action of the rolls and insuring delivery of the husked ears in cleaned condition.

Another object resides in the provision of a novel arrangement of gathering chains, which not only effectively guide the stalks to the snapping rolls, but also serve to deliver the snapped ears to the elevating conveyor.

Another object resides in folding the transverse discharge conveyor upon the machine for the purpose of compactness in transporting the machine to and from the field.

A further object resides in positioning and balancing the various units with relation to the supporting wheels so as to facilitate tilting adjustment of the machine with minimum effort, thus relieving load and strain upon the tractor.

Another object resides in the provision of shiftable draft means, whereby relative positioning of the machine and tractor may be varied for either field work or transportation.

A still further object resides in positioning the supporting wheels inwardly of the main frame, thus reducing the tread width to a minimum, which in turn provides an exceedingly compact machine, and reduces the tendency of side draft, particularly in field work, at which the draft occurs at one side of the machine.

Another object is to provide means in connection with the discharge conveyor for delivering separated kernels of corn, accidentally lodged in the track of the discharge conveyor chain, to a receiving trough, and at the same time cleaning the kernels and eliminating dirt from the track by allowing the same to be carried off by the wind.

With the above and other objects in view, which will appear as the description proceeds, the invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawings is illustrated one complete example of the physical embodiment of the present invention constructed according to the best mode so far devised for the practical application of the principles thereof.

In the drawings, Figure 1 is a side elevation of a machine constructed in accordance with the present invention;

Figure 2 is a similar elevation taken from the opposite side of the machine;

Figure 3 is a longitudinal section taken on the line 3—3 of Figure 6;

Figure 4 is a transverse section taken on the line 4—4 of Figure 6;

Figure 5 is a transverse section taken on the line 5—5 of Figure 3;

Figure 6 is a plan section taken on the line 6—6 of Figure 3, the frame and casing being eliminated, and certain of the parts being shown schematically for the purpose of more clearly illustrating structural details;

Figure 7 is a fragmentary plan view of a portion of the frame and draft bar, the same being taken approximately on the line 7—7 of Figure 2;

Figure 8 is a fragmentary detail view of the link for adjustably tilting the main frame;

Figure 9 is a detail fragmentary section taken on the line 9—9 of Figure 7; and

Figure 10 is an enlarged detail section through the discharge conveyor and trough, the same being taken on the line 10—10 of Figure 5.

Referring now more particularly to the accompanying drawings, the present invention comprises a main frame designated by the numeral 1, which is fabricated in the usual manner from angle irons or the like, and comprises longitudinal stretches 2, connected by transverse braces 3. Suitable uprights 4 are carried by the longitudinal and transverse members, and have secured thereto the upper longitudinal stretches 5 and the transverse irons 6.

Secured to the main frame intermediate its front and rear ends, and within its outer longitudinal stretches, are a pair of stub axles 7, which carry the supporting wheels 8, as best shown in Figure 9, the stub axles being secured to the transverse irons 3 by conventional U-bolts 9. Thus, it will be seen that the supporting wheels, being positioned entirely within the main frame, provide a minimum width tread, and materially reduce the width of the machine, which also has the advantage of reducing the tendency of side draft, particularly during field work, wherein the draft is at one side of the frame, as will be hereinafter described.

As will be noted in Figures 1 to 3, inclusive, the forward ends of the longitudinal stretches 2 and 5 converge downwardly and are suitably connected at their forward ends, thus providing an inclined frame portion which serves to carry the gatherers and picking rolls, as will be hereinafter described.

Suitably carried at the forward end of the main frame 1, upon the inclined longitudinal stretches 2 and 5, are the usual spaced gatherers comprising outer gathering hoods 10 and the intermediate hood 11 cooperating to provide two guideways for stalks, as they travel through the picking rolls, thus adapting the machine to handle two rows of corn at one time.

The forward ends of the main frame, which serve to support the front ends of the gathering hoods 10 and 11, have hinged thereto gathering points or guards 13, which have a floating action and are free to follow the uneven contour of the ground, thus permitting the same to ride under fallen stalks that would otherwise be missed. However, in order to prevent the guards from digging into the ground, the same are provided with tail pieces 13', adapted to engage below the connecting brackets to limit downward movement of the guards, and at the same time prevent the guards from swinging upwardly as the tail-piece will engage the ground.

The longitudinally inclined plates 14 are connected to the stretches 5, upon opposite sides of the forward projecting portion of the main frame, by suitable brackets 15, the plates 14 serving to carry the rear outer gathering chains 16, while supported above the forward ends of the plates 14, and connected with the outer gathering hoods 10 by brackets 17, are plates 18 which serve to carry the forward outer gathering chains 19. Thus it will be seen that the forward gathering chains 19 initially engage the stalks at a point closely adjacent the ground, and, after guiding the same to the picking rolls, they are further assisted through the rolls by the rear chains 16.

Also, it will be noted that the gathering chains 16 and 19 are slightly inclined outwardly at their opposite ends, while their overlapping inner end portions are positioned in a common vertical plane, as best shown in Figure 6.

Positioned between the outer plates 14, and spaced therefrom, is an intermediate apron 20 carried on the intermediate longitudinal stretches 5 by means of suitable brackets 21, while projecting forwardly from the end of apron 20, and positioned above the same, is a plate 20' which carries a pair of opposed inner gathering chains 22, that cooperate with the outer gathering chains 19, to feed the stalks to the picking or snapping rolls 26.

Positioned below the chains 22, in overlapped relation, and extending rearwardly and inwardly therefrom, is a second set of gathering chains 22', which cooperate with the chains 22 in guiding stalks to the snapping rolls, and further serve to carry the snapped ears inwardly from the picking rolls to an elevating conveyor 23.

Journalled within suitable boxes 24 and bearings 25, and positioned longitudinally within the gaps occurring between the plates 14 and the apron 20, are two sets of inclined conventional picking rolls 26 rotated in opposite directions to snap the ears from the stalks delivered thereto by the gatherers in the usual manner, and inasmuch as the lower ends of the picking rolls extend to a point closely adjacent the ground, obviously as the machine travels forwardly, the picking rolls will effectively remove the ears from the stalks throughout their entire height. As the stalks travel rearwardly between the rotating rolls 26, the same are confined within the guards 27 carried by the longitudinal stretches 2 and 5 of the main frame, the guards being preferably closed at their rear ends to turn the stalks downwardly after the same have passed through the picking rolls, thus preventing the stalks from becoming entangled within the mechanism carried at the rear of the machine.

As best shown in Figure 3, the elevating conveyor 23 is inclined upwardly at a greater angle than the snapping rolls, thus positioning the lower end of the conveyor slightly below the top of the snapping rolls, while the greater portion of the conveyor is positioned above the snapping rolls.

Because of the foregoing, the apron 20, which conforms to both the angle of the elevating conveyor 23 and the angle of inclination of the snapping rolls 26, is inclined downwardly and laterally from the conveyor to the snapping rolls throughout the greater portion of its length, as shown in Figures 4 and 6. Thus, in operation, should bent stalks or other refuse tend to lay over upon the apron 20, in engagement with the elevating conveyor 23, the laterally inclined surfaces of the apron will tend to deflect such stalks laterally towards the picking rolls, thus preventing the stalks, as well as other refuse, from being carried up by the elevating conveyor, which in practice provides for ultimate cleaner delivery of the picked and husked ears, as the subsequent husking rolls are only required to dispose of a minimum of excess material.

In the operation of the elevating conveyor 23, there may be occasions when a bent stalk or foreign refuse is delivered to the elevating conveyor 23, and becomes so engaged by the same as to prevent it from being deflected to the picking rolls. Therefore, to further provide for the removal of stalks and foreign refuse from the elevating conveyor, a pair of stripper tracks 28 are mounted upon the apron 20 adjacent the sides of the conveyor 23, and at the upper end of the apron 20, the same being best illustrated in Figures 3 and 4.

From the foregoing it will be apparent that should stalks or other refuse become engaged laterally in the conveyor and project to either side thereof, they will be engaged by one of the side tracks 28 to deflect the same upon the apron 20 from which they are again delivered to the snapping rolls 26, and thus discharged from the machine.

Before proceeding with the description of the remaining portion of the machine, the picking operation will be explained in detail.

Obviously, due to the flared mouths of the gatherers 10 and 11, and the corresponding relative positions of the forward gathering chains 19 and 22, in combination with the gathering points 13, all stalks adjacent the rows, whether standing or bent down upon the ground, will be effectively gathered and delivered to the picking rolls 26, which, as the stalks pass therebetween, serve to snap or pick the ears therefrom, and due to the inclination of the snapping rolls, and the apron 20, the picked ears will be gravitated inwardly toward the bottom of the conveyor 23. Should the operation of the machine be stopped at any time, the picked ears are prevented from being discharged from the lower ends of the picking rolls, by retarding flaps 29, which are carried by the gathering hood 11. The flaps 29 are preferably formed of flexible material, such as leather, rubber, or the like, in order to permit the stalks to pass through the picking rolls. Should any ears be delivered to the lower end of the apron 20, rather than to the conveyor 23, the gathering lugs carried by the chains 22' will engage the same and carry them inwardly upon the apron 20, from which they are discharged to the elevating conveyor 23, and carried upwardly to be delivered to the subsequent husking rolls.

To prevent accidental discharge of the picked ears from the lower end of the elevating conveyor, a flexible flap 30 is positioned transversely thereof and secured to a depending transverse plate 31, carried by the intermediate gathering hood 11. Thus, any ears that are not picked up by the conveyor in the first instance will be retained by the flap 30 until subsequent lags of the conveyor engage the same.

From the foregoing it will be appreciated that a highly efficient structure has been provided, wherein the inner gathering chains not only cooperate to deliver stalks to the snapping rolls, but also function to deliver the snapped ears to the elevating conveyor, and due to the variance in the angle of inclination of the conveyor and the snapping rolls, with resultant lateral inclination of the apron 20, stalks and refuse are effectively deflected away from the conveyor and discharged by the snapping rolls, thus preventing delivery of refuse to the subsequent husking rolls. It will also be seen that means is provided in the inclined tracks 28 for removing stalks or foreign material that might accidentally become entangled and carried up by the elevating conveyor.

Extending from the upper end of the intermediate gathering hood 11, and serving to house the upper end of the elevating conveyor 23, is a partially open hood 32 carried by the main frame in any suitable manner and communicating with a housing 33, open at its lower end and having positioned therein the inclined husking rolls 34, longitudinally alined with the elevating conveyor 23. An inclined bottom plate 32', receives the snapped ears from the elevating conveyor 23, and extends over the upper end of the husking rolls 34 to deliver the ears thereto.

It is to be noted, as best shown in Figure 3, that the top of the hood 32 is opened for a limited distance adjacent the top of the conveyor 23. The purpose of this is to prevent clogging in the event that a stalk or elongated piece of material is accidentally carried up by the conveyor. In the event that the top of the hood were closed, it will be readily seen that as the stalk travels over the top end of the conveyor, its rear end would engage the top of the hood, causing the stalk to become wedged. However, the open top permits the rear ends of the stalks to freely tilt upwardly and be discharged from the conveyor to the husking rolls.

Due to the fact that in some instances the ears of corn discharged upon the plate 32' may have a tendency to bounce or be deflected forwardly and become entangled with the lower stretch of the conveyor 23, a vertical flexible guard flap 35, extending laterally of the hood 32, is secured to the plate 32' closely adjacent the lower stretch of the conveyor 23, thus preventing accidental engagement of discharged ears with the lower stretch of the conveyor.

Furthermore, inasmuch as the conveyor 23 is driven at sufficient speed to occasionally cause ears to be rapidly discharged or thrown therefrom, a vertical retarding plate 36 is pivotally suspended within the housing 33, thus serving to retard the discharged ears and deflect them into operative engagement with the upper end of the husking rolls, thereby causing the ears to travel over the entire length of the husking rolls, insuring complete and rapid husking of the same.

Obviously, the hinged plate 36 will also serve to retard ears delivered to the husking rolls in the event that there is any excessive accumulation of the same, thus preventing overcrowding of the husking rolls and permitting only a sufficient quantity of ears to travel down the same to provide for complete husking of the same.

To further retard travel of the ears upon the husking rolls, and insure complete husking of the same, a rotary beater 37 is mounted transversely within the housing 33 above the husking rolls 34. The beater 37, which is of conventional structure, is rotated in a direction opposite to the direction of travel of the ears upon the husking rolls, and inasmuch as the lateral flaps of the beater are preferably constructed of flexible material, the same will engage and retard the ears without mutilating the same.

To confine the ears upon the effective surface of the husking rolls, which are of any conventional structure, inwardly flared aprons 38 are secured to the inner sides of the housing 33 and terminate closely adjacent the upper face of the outer husking rolls 34. Access to the hood 32, for the purpose of cleaning or repairing the mechanism contained therein, is obtained through the opening in the top, and a hinged cover portion 39, while access to the lower end of the husking rolls is obtained through the hinged cover 40.

Thus it will be seen that while the husking mechanism is completely housed to protect the same and effectually retain the ears of corn in engagement therewith, access can be readily had to the same should the machine at any time become clogged or damaged.

To further assist in ridding the husking rolls of loose husks, leaves, and such refuse as may reach the rolls, the top of the housing 33 has mounted thereon a blower 130, having its discharge mouth 131 projecting through and extending transversely of the housing. The discharge mouth 131 is directed downwardly toward the husking rolls, just back of the flap 36. Thus any loose material passing under the discharged blast of air is quickly forced through the rolls, which enables the rolls to function with maximum efficiency in their husking operation. To further assist the elimination of loose material by the forced blast, a second flap 132 is hinged at the rear of the discharge mouth 131, thus confining and concentrating the air stream within a limited area.

Also, the blower 130 may be adjustably mounted on the housing 33, whereby the point of contact of the discharge blast with the husking rolls may be varied to compensate for different conditions of material, best maintaining maximum efficiency at all times.

As best shown in Figure 3, the upper and lower ends of the husking rolls 34 are journalled in the transverse brackets 41 suitably carried by the main frame, while positioned over the lower ends of the husking rolls, is an inclined shield 42, which receives and delivers the husked ears from the rolls 34 to an inclined discharge trough 44, also carried by the main frame and having mounted therein a discharge conveyor 53, which elevates and discharges the husked ears to a wagon box, or other suitable receptacle provided adjacent one side of the machine, the same forming no part of the present invention.

The trough 44 is formed in two complementary sections, the outer section 44' being carried in a saddle strap 45 pivotally connected to brackets 46 carried by the uprights 4, and to which the outer end of the trough 44 is also connected, thus providing for folding the outer section 44' back upon a suitable support 47 carried by one of the uprights at the opposite side of the machine. In normal operative position, the hinged projected end 44' is supported by a link or cable 48 connected to a brace 49, carried by the main frame, and to the yoke 50, secured to the outer end of the section 44'.

Positioned below the conveyor trough 44 is a receiving trough 51, the outer portion 52 of which is inclined upwardly for reception of an outer section 52' carried by the strap 53' connected to the yoke 50. The elevating chain conveyor 53 travels upwardly within the trough 44 and has its return stretch passing under an idler 54, causing the same to travel upon the bottom of the receiving trough 51, as best shown in Figure 5.

From the foregoing explanation it will be seen that for the purpose of compactness in transporting the machine over highways, to and from the field, the outer end of the discharge trough can be readily folded and collapsed over upon the frame of the machine, the portion 52' of the return trough also being folded back with the collapsible section 44', thus materially reducing the width of the machine to permit the same to travel over narrow roads and the like, or to be extended when in the field to discharge ears of corn into a wagon drawn along the side of the machine, but spaced therefrom.

The idler sprocket 54 is carried by a suitable bracket 55 connected with the main frame. The horizontal bottom portion of the receiving trough 51 is preferably formed of screening or perforated material to provide for the discharge of dirt or refuse accumulating therein. Communicating with one end of the receiving trough 51, and housing the lower end of the conveyor trough 44, is a casing 56, provided with a hinged cover 57 to provide access to the conveyor trough. Here, as in connection with the elevating conveyor 23, a flexible retaining flap 58 is provided adjacent the lower end of the conveyor trough 44 and secured to the wall of the housing 56 to prevent the husked ears delivered to the conveyor trough 44 from being accidentally discharged by gravity from the lower end thereof.

Having described the picking and husking operation of the ears, attention is called to the provision of means for collecting loose kernels of corn, which are accidentally separated from the husked ears during the husking operation, and thereafter delivering or discharging the same to the vehicle or receptacle for receiving the husked ears. This is accomplished by means of a shaker trough 60 positioned below the housing 33 to receive the material passed through the husking rolls. The forward end of the shaker trough 60 is mounted upon a crank 61, journalled in brackets 62 carried by the vertical supports 4, which are secured to the central transverse braces 3 and 6. The outer end of the trough 60 is pivotally supported upon the links 62' pivotally connected to the main frame.

As the crank 61 is rotated, it will be quite apparent that rapid, oscillatory movement is imparted to the trough 60, which is of conventional structure comprising a perforated finned plate 64 that intermittently feeds the husks and coarse material discharged thereon toward the rear end of the shaker, from which they are discharged upon the ground. Obviously, during this operation, separated kernels and fine particles of refuse will be sifted through the perforated plate 64 to the screen 65 positioned beneath the same, the screen serving to collect and separate the kernels from dirt and dust, and deliver the same to the receiving trough 51 through a suitable opening 66 provided at the end of the screen 65 and communicating with the receiving trough. The bottom of the receiving trough 51, being perforated, serves to sift out fine particles of dirt from the separated kernels which are then picked up by the conveyor 53 and carried up the trough 44 and delivered with the husked ears.

It will be noted that the rear end of the shaker trough projects through the upper and lower stretches of the conveyor 53, and between the troughs 44 and 51, to discharge material just beyond the same, thus materially shortening the length and height of the machine.

As best shown in Figure 10, the bottom of the elevating trough 44 is preferably provided with a wood filler 67, having a central channel 68 for reception of the conveyor chain, which carries the angle iron buckets 69. Those separated kernels retained within the buckets will naturally be carried upwardly by the same. However, in practice, it has been found that some of the kernels become dislodged from the buckets and find their way into the chain channel 68, together with small particles of refuse. Therefore, in order to remove and collect the separated kernels from the channel 68, and also eliminate small particles of refuse accumulating therein, the bottom filler 67 is provided with an elongated discharge opening 70 of substantially the width of the channel 68 and alined with a corresponding opening 71 in the bottom of the trough 44. Obviously, as the separated kernels and refuse lodged within the chain channel are carried upwardly by the chain, the same will be delivered through the openings 70 and 71, dropping through a chute 72 carried by the trough 44. The chute 72 may be provided with an intermediate portion of screening 73 which allows air to blow through the chute and remove particles of dust and the like from the kernels, which are eventually returned to the receiving trough 51, where they are again picked up by the buckets 69.

From the foregoing it will be quite apparent that extremely simple and efficient provision has been made for not only handling the husked ears and separated kernels, but for also eliminating practically all dirt and refuse, providing for delivery of the husked ears and separated kernels in an extremely clean condition.

Taking up the draft means, particular attention is directed to Figures 2, 7, 8 and 9, wherein it will be noted that an exceedingly simple and rigid draft connection has been provided for connecting the harvester with a tractor or other suitable draft means. The draft frame 74 is preferably fabricated from angle irons, and comprises a substantially triangular framework provided with spaced rearward extensions 75 connected with bearing boxes 76 journalled on the stub axles 7, to provide for relative movement between the draw frame and the frame of the harvester, for the purpose of tilting adjustment of the latter, as will be hereinafter described.

The frame 74, which projects forwardly from the stub axles, converges towards its forward end and carries a yoke 77 for reception of a draw bar 78 provided with any suitable means for attachment to a tractor. Adjacent the rear end of the draw frame, the same is provided with a pair of spaced braces 79 to which is attached a U-shaped strap 80 for reception of the inner end of the draw bar 78. A pin 81, inserted through the draw bar, engages the braces 79 and prevents withdrawal of the draw bar. At the same time the draw bar is permitted to rotate or twist relative to the draw frame, thus allowing free movement between the traction device and harvester.

In the normal operation of the present machine it is necessary to longitudinally offset the same with relation to the tractor or draft means, which is accomplished when the draw bar is positioned, as shown in Figure 7, the same being held within the yoke 77 by a pin 77'. However, in transporting the harvester over roads to and from the field, it is desirable for the purpose of compactness to position the tractor directly in front of the machine. Therefore, a yoke 82 is mounted upon one side of the draw frame for reception of the draw bar, and an additional U-shaped strap 83, for reception of the inner end draw bar, is secured to suitable transverse stretches of the draw frame, adjacent its outer side, as best shown in Figure 7, wherein the transporting position of the draw bar is indicated in dotted lines.

Thus it will be seen that in order to vary the relative position of the tractor and harvester, for either transportation or field work, it is merely necessary to position the draw bar within the draw frame in either of the positions provided for such operation, which only necessitates the removal of the retaining pins 81 and 77', thus readily permitting the draw bar to be slightly withdrawn and swung within the frame to the desired position.

In order to provide for relative adjustment between the draw frame and harvester, and allow the desired tilting adjustment of the harvester, a fabricated frame 84, constituting a link connection between the main frame of the harvester and the draw frame, is pivotally connected to the upper transverse member 6 of the main frame by suitable brackets 85. The outer or free end of the frame 84 is pivotally connected to a lever 86, which in turn is pivotally mounted at the outer end of the draw frame and locked in adjusted position by means of a conventional detent 87 carried by the draw frame.

As best shown in Figure 2, it will be readily seen from the foregoing that upon actuation of the lever 86, working through the link frame 84, the relative position of the draw frame and the harvester may be varied, and inasmuch as the draw frame is suitably supported by the tractor, the front end or nose of the harvester may be easily adjusted with relation to the ground.

Here it will be appreciated that in arranging the various elements of the harvesting machine so as to substantially balance the machine upon the supporting wheels, the desired tilting adjustment of the harvester frame is accomplished with little effort, and also excessive strain upon the draw frame, and consequently upon the tractor, is relieved.

Having thus described the structural features and operation of the machine, the drive for the various elements will be explained. In instances where the harvester is drawn by a tractor, power is obtained from the usual tractor power take-off (not shown), which is connected with the shaft 88 having a universal connection 89 with the shaft 90, one end of which is journalled in a bearing bracket 90' pivotally carried by a suitable bracket 91, secured to the draft frame adjacent its outer end, as best shown in Figure 2. Obviously, the universal connection 89 compensates for relative movement between the harvester and tractor. Inasmuch as the draw frame and main harvester frame are relatively adjustable, provision must be made to permit movement of the shaft 90 with relation to the transmission mechanism carried by the main frame. This is accomplished by a universal coupling 92 connecting the shaft 90 with a stationary shaft 93 journalled in a gear casing 94 mounted on the main frame.

As best shown in Figure 6, the shaft 93 is operatively connected through bevel gears 95 with the transverse shaft 96, which shaft is also journalled in the gear box 94, and in the boxes 97, the latter housing bevel gears 98 operatively connecting the shaft 96 with the rolls 26, one of each set of rolls being driven by the shaft 96, while the adjacent roll receives its drive through the spur pinions 99, housed within the journal boxes 24 carried by the stretches 5 of the main frame, as indicated in Figure 1.

The drive for the outer gathering chains 16 and 19 is taken off of the driven picking rolls through the chain and sprocket connections 100, which drive the forwardly projecting shafts 101 operatively connected through bevel gears 102 with the vertical shafts 103, which shafts carry the rear set of sprockets over which the gathering chains 16 travel.

As best shown in Figures 1 and 6, bearing boxes 104 mounted on brackets 105 carried by the main frame, serve both to house the bevel gears 102 and as a bearing for their respective shafts.

The forward ends of the gathering chains 16 are trained over the sprockets 106 mounted on vertical shafts 107, the upper end of which shafts are provided with sprockets which carry and drive the forward gathering chains 19, this being best illustrated in Figure 6. The shafts 107 are provided with flexible joints to compensate for the difference in angularity between the gathering chains 16 and 19, and the plates which carry the same.

A chain and sprocket connection 108, between the transverse shaft 96 and the upper conveyor shaft 109, serves to drive the elevating conveyor 23, the lower end of which is trained over suitable sprockets mounted on a transverse shaft 110 in bevel gear connection with the vertical shafts 111, which drive the gathering chains 22'.

The drive for the husking rolls 34 is taken off of the transverse shaft 96 through the bevel gears 112, whereby one of the husking rolls is driven, and rotation imparted to the adjacent rolls, through a train of spur gears 113 carried adjacent the upper ends of the husking rolls, as best shown in Figures 3 and 6.

From the transverse shaft 96 a chain drive 114 is trained over the sprocket 115 secured to the shaft 116, which carries the beater 37. From the sprocket 115 the chain 114 is trained over sprocket 140, and serves to rotate the shaft 117 through the bevel gear connection 118. The shaft 117 is provided with a sprocket 119, which drives the discharge conveyor 53.

In order to impart reciprocative movement to the shaker trough 60, a chain and sprocket connection 120 is provided between the transverse drive shaft 96 and the crank shaft 61, thus causing the crank to be rotated, and, in cooperation with the links 62', impart an oscillatory movement to the shaker trough.

The blower 130 is driven by means of a belt connection 141 between the blower pulley and the pulley 142 secured on the shaft 96.

Having thus described the various driving connections, it is understood that the same may be variously arranged to coordinate the movement of the various working elements and therefore the same forms no particular part of the present invention.

It is also to be understood that aside from the novel features of the invention residing in the particular combination and arrangement of the various working elements, that numerous modifications in the structural details of the same are contemplated as coming within the scope of the invention, inasmuch as the working elements combined are more or less conventional.

We claim:—

1. A corn harvester comprising inclined picking rolls, an elevating conveyor inclined at a greater angle than that of the picking rolls and having its lower end only positioned slightly below the top surface of the picking rolls, means for delivering ears of corn from the picking rolls to said conveyor, and means for deflecting other material from said conveyor towards said picking rolls.

2. A corn harvester comprising inclined picking rolls, an elevating conveyor inclined at a greater angle than that of the picking rolls and having its lower end only positioned slightly below the top surface of the picking rolls, means for delivering ears of corn from the picking rolls to said conveyor, and laterally inclined aprons for deflecting other materials from said conveyor towards said picking rolls.

3. A corn harvester comprising inclined picking rolls, an elevating conveyor inclined at a greater angle than that of the picking rolls and having its lower end only positioned slightly below the top surface of the picking rolls, an inclined apron between the picking rolls and said conveyor for deflecting material from said conveyor towards said picking rolls, and gathering chains for delivering ears from said picking rolls to said conveyor.

4. A corn harvester comprising picking rolls, an elevating conveyor inclined at a greater angle than that of the picking rolls and having its lower end only positioned slightly below the top surface of the picking rolls, an apron disposed between said conveyor and picking rolls, means for delivering ears of corn from said picking rolls to said conveyor, and strippers disposed adjacent the longitudinal edges of said conveyor for disengaging material therefrom.

5. A corn harvester comprising inclined picking rolls, an elevating conveyor inclined at a greater angle than that of the picking rolls and having its lower end only positioned slightly below the top surface of the picking rolls, an apron disposed between said conveyor and picking rolls for deflecting material towards said picking rolls, means adjacent the lower ends of said picking rolls and conveyor for preventing the discharge of ears therefrom, and means for delivering ears from said picking rolls to said conveyor.

6. A corn harvester comprising spaced sets of inclined picking rolls, an elevating conveyor positioned between said sets of picking rolls and being inclined at a greater angle than that of the picking rolls, spaced sets of gathering chains for guiding standing stalks of corn through said picking rolls, aprons disposed between said picking rolls and said conveyor for deflecting material from the conveyor towards said picking rolls, said sets of gathering chains serving to deliver ears of corn from said picking rolls to said conveyor, means adjacent the lower ends of said picking rolls and said conveyor for preventing the discharge of ears of corn therefrom, and strippers positioned adjacent the sides of said conveyor for disentangling material therefrom.

7. In combination with a corn harvester having a main frame, and a discharge conveyor projecting laterally therefrom; a draw frame connected with said main frame for relative movement therewith, and a draw bar shiftably carried by said draw frame.

8. In combination with a corn harvester having a main frame, and a discharge conveyor projecting laterally therefrom; a hinged outer section for said conveyor, said section being foldable on said main frame, a draw frame connected with said main frame for relative movement therewith, and a draw bar shiftably carried by said draw frame.

9. In combination with a corn harvester having a main frame, and a discharge conveyor projecting laterally therefrom; a hinged outer section for said conveyor, said section being foldable on said main frame, a draw frame connected with said main frame for relative movement therewith, and a draw bar shiftably and rotatably carried by said draw frame.

10. In combination with a corn harvester having a main frame, a draw frame connected therewith for relative movement, a draw bar carried by said draw frame, and means carried by the draw frame for receiving said draw bar in one of two positions.

11. In combination with a corn harvester having a main frame, a draw frame connected therewith for relative movement, a draw bar carried by said draw frame, and spaced retaining means carried by said draw frame for selective reception of said draw bar.

12. In combination with a corn harvester having a main frame, a draw frame connected therewith for relative movement, a pair of spaced saddles carried by said draw frame for receiving the rear end of said draw bar, and a pair of spaced yokes cooperating with said saddles and engaging the forward portion of said draw bar to retain the same in adjusted position.

13. In combination with a corn harvester having a main frame, a draw frame connected therewith for relative movement, a pair of spaced saddles carried by said draw frame, and a draw bar for selective and rotatable engagement in either of said saddles.

14. In combination with a corn harvester having a main frame, stub axles carried by the main frame, supporting wheels mounted on said stub axles, a draw frame pivotally mounted on said axles, a link frame pivotally connected to said main frame, means carried on the draw frame and connected with said link frame for relative adjustment of said main frame and draw frame, and a draw bar shiftably and rotatably carried by said draw frame.

15. A corn harvester comprising inclined picking rolls, an elevating conveyor for receiving ears of corn from said picking rolls, husking rolls for receiving ears from said elevating conveyor, and a hood covering said elevating conveyor and husking rolls, said hood being provided with an opening in its top portion adjacent the upper end of said elevating conveyor.

16. A corn harvester comprising a main frame, supporting wheels mounted entirely within said main frame, a draw frame connected with said main frame, and a draft bar extending from one side of said draw frame.

AUGUST ROSENTHAL.
HENRY L. ROSENTHAL.